US012770187B2

(12) United States Patent
Saigh et al.

(10) Patent No.: US 12,770,187 B2
(45) Date of Patent: Oct. 20, 2026

(54) GEOMETRICAL RARITY CORRELATION, VENTTINIZATION AND PROTECTION SYSTEM AND TOOLKIT

(71) Applicants: Michael Saigh, Clayton, MO (US); Xiaohong Zhang, Clayton, MO (US)

(72) Inventors: Michael Saigh, Clayton, MO (US); Xiaohong Zhang, Clayton, MO (US)

(73) Assignee: Liquid Rarity Exchange LLC ( Puerto Rico LLC), Humacao, PR (US)

( * ) Notice: Subject to any disclaimer, the term of this patent is extended or adjusted under 35 U.S.C. 154(b) by 48 days.

(21) Appl. No.: 15/441,417

(22) Filed: Feb. 24, 2017

(65) Prior Publication Data

US 2018/0247371 A1 Aug. 30, 2018

(51) Int. Cl.
*G06Q 40/04* (2012.01)

(52) U.S. Cl.
CPC .................................... *G06Q 40/04* (2013.01)

(58) Field of Classification Search
CPC ............................... G06Q 40/04; G06Q 50/01
USPC ............................................................ 705/37
See application file for complete search history.

(56) References Cited

U.S. PATENT DOCUMENTS 8,015,069 B2 * 9/2011 Saigh ..................... G06Q 40/06 705/26.1
9,266,370 B2 * 2/2016 Jung ........................ B41M 3/14
9,290,810 B2 * 3/2016 Farquar .............. G01N 21/6428
2005/0289061 A1 * 12/2005 Kulakowski ........... G06Q 99/00 705/50
2007/0048761 A1 * 3/2007 Reep .................... C12Q 1/6816 435/6.11
2010/0250497 A1 * 9/2010 Redlich .................. G06Q 10/06 707/661
2011/0022494 A1 * 1/2011 Lutnick .................. G06Q 40/06 705/26.25
2011/0246212 A1 * 10/2011 Barnes ................... G06Q 10/10 705/1.1
2014/0075004 A1 * 3/2014 Van Dusen ............ G06Q 50/01 709/223
2017/0178236 A1 * 6/2017 Saigh ..................... G06Q 40/04

(Continued)

FOREIGN PATENT DOCUMENTS

CA 2258436 A1 * 11/1998 ............... G07F 7/12

OTHER PUBLICATIONS

Whitmore et al. "Micro-Fading Tests to Predict the Result of Exhibition: Progress and Prospects"; 2013; pp. 200-205.*

(Continued)

*Primary Examiner* — Igor N Borissov
(74) *Attorney, Agent, or Firm* — Tucker Ellis LLP

(57) ABSTRACT

In described embodiments, includes Geometric Rarity Vettinization (GRV) where both buyer and sellers can exchange title and ownership for all classifications of rarity assets (tangible assets) and intangible assets. In addition, secure computer generated and indicated inputs based on mathematical and geometric particle identification and relativity, locations and relationships and could be integrated with scientific diagnostics for each rarity examined throughout the online trading process. Furthermore, GRV set-points are globally indexed and retrieved by authorized personnel and could be utilized for global rarity trading through various platforms and protocols and developer's tools kits.

25 Claims, 7 Drawing Sheets

(56) References Cited

U.S. PATENT DOCUMENTS

2020/0050483 A1* 2/2020 Shear .................... H04L 47/70

OTHER PUBLICATIONS

Whitmore et al. "Micro-Fading Tests to Predict the Result of Exhibition: Progress and Prospects"; Abstract; 2013; p. 1.*

Daniela Paunescu et al.—"Particles with an identity: Tracking and tracing in commodity products", ETH Zurich, Institute for Chemical and Bioengineering, Vladimir-Prelog-Weg 1, 8093, Zurich, Switzerlan; http://dx.doi.org/10.1016/j.powtec.2015.12.0350032-5910/ © 2016; p. 344-350.*

* cited by examiner

FIG. 1 100 Rarity Trading Platform Network

*Rarity Systems- GEOMETRIC VETTINIZATION*

2d GRV Associations
Exemplified

3D GRV
Associations
Exemplified

Fig. 5 500 RARITY SECURE ONLINE GRV EXCHANGE WAREHOUSE AND DATA ENTRY SYSTEM
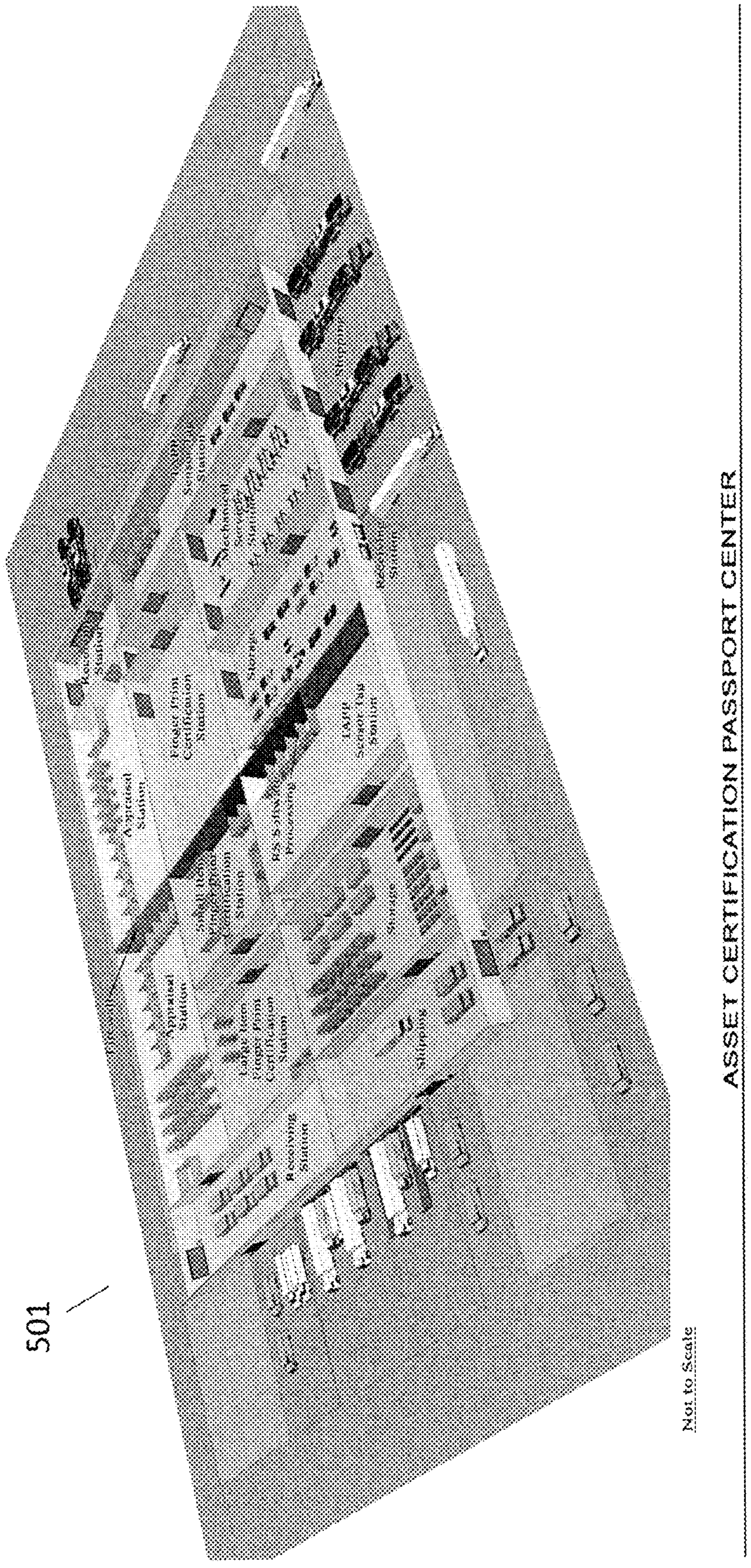

Fig. 6 600 Robotic Mobile Scientific Device RMSD and Controller
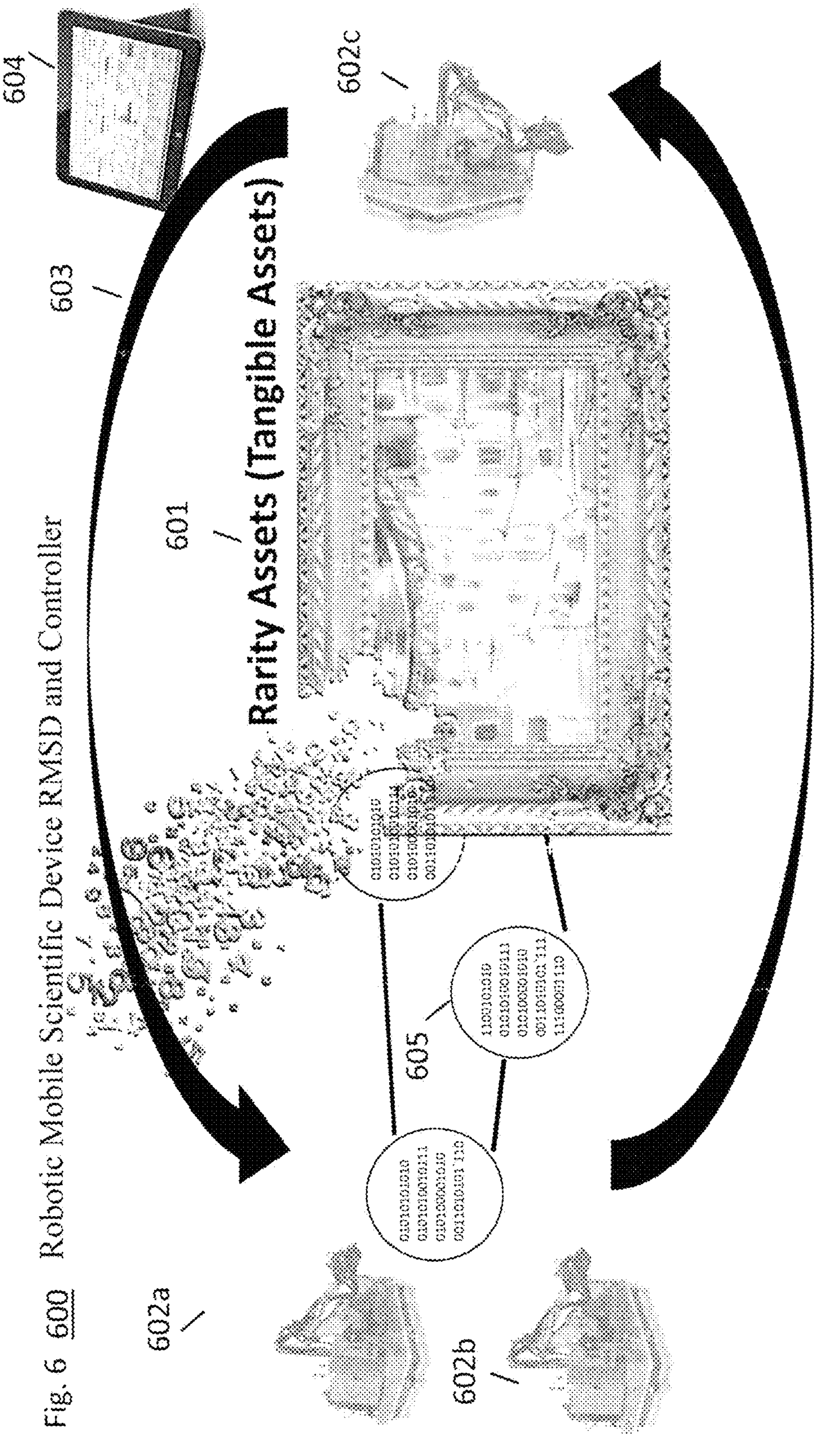

Fig. 7 700 Scientific Measurement and Controller as it relates to a Creator's or Creators' biodata DNA/RNA
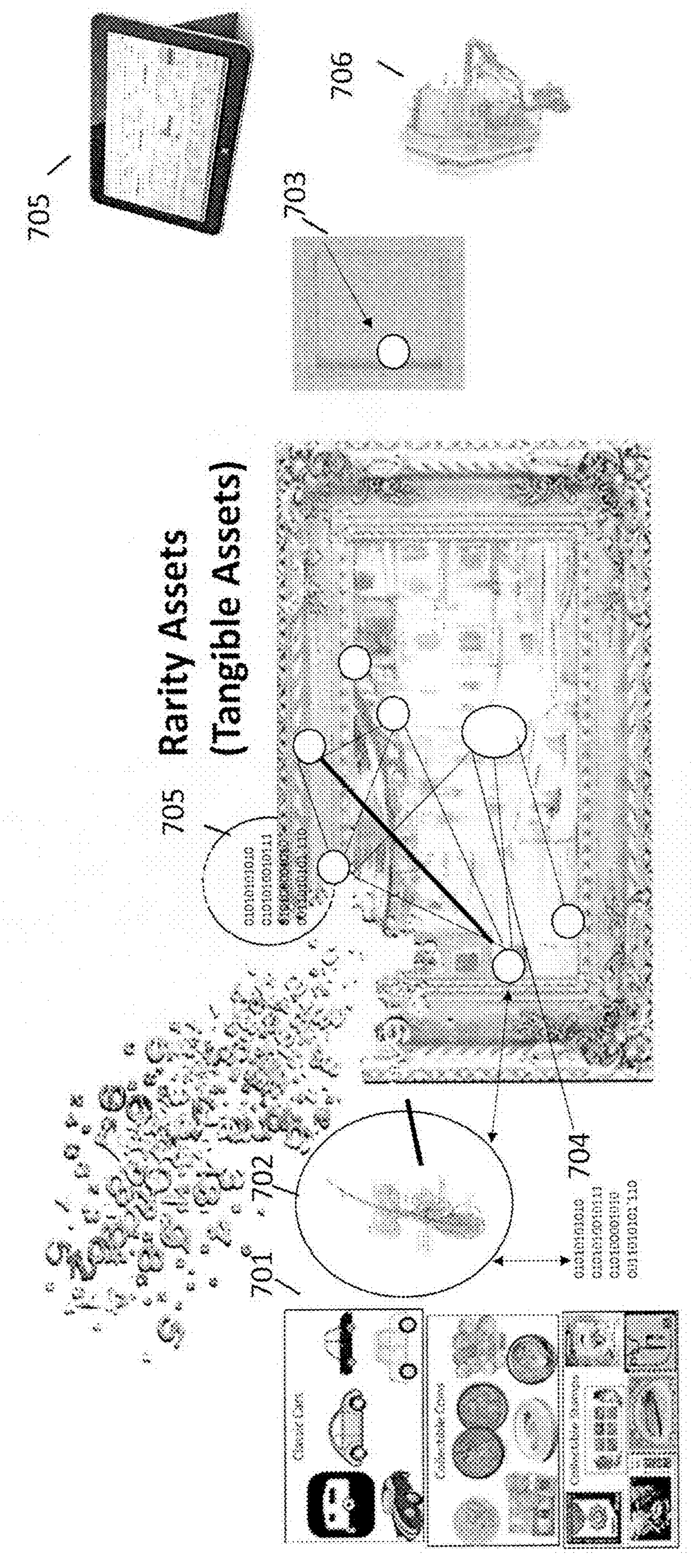

GEOMETRICAL RARITY CORRELATION, VENTTINIZATION AND PROTECTION SYSTEM AND TOOLKIT

CROSS-REFERENCE TO RELATED APPLICATIONS

Not Applicable.

STATEMENT REGARDING FEDERALLY SPONSORED RESEARCH OR DEVELOPMENT

Not applicable.

Field of the Invention: The present invention and disclosure relates generally to a high-value asset exchange, digital clearing-house and protection system; specifically, a system with authentication technology, tracking, computer generated scientific geometric relativity and geometric pixelated and molecular relativity as it relates to title transfer, referred to herein as Geometric Rarity Vettinization (GRV).

BACKGROUND

Description of the Related Art

Currently Scientific forensics have been used for several decades are costly and have not been effective and as a result it's estimated that over $10 billion USD are fraudulent in the fine arts (tangible asset sub-classification) alone.

Molecules have fixed equilibrium geometries—bond lengths and angles—about which they continuously oscillate through vibrational and rotational motions. A pure substance is composed of molecules with the same average geometrical structure. The chemical formula and the structure of a molecule are the two important factors that determine its properties, particularly its reactivity. Isomers share a chemical formula but normally have very different properties because of their different structures. Stereoisomers, a particular type of isomer, may have very similar physico-chemical properties and at the same time different biochemical activities.

A molecule is an electrically neutral group of two or more atoms held together by chemical bonds. Molecules are distinguished from ions by their lack of electrical charge. However, in quantum physics, organic chemistry, and biochemistry, the term molecule is often used less strictly, also being applied to polyatomic ions.

In the kinetic theory of gases, the term molecule is often used for any gaseous particle regardless of its composition. According to this definition, noble gas atoms are considered molecules as they are in fact monoatomic molecules.

Particles are defined as it relates to one or more tangible assets as a relative comparative measurement, one or more materials, one or more molecules, elements of a Periodic table or combination of elements, neutrons, protons, including any group of atoms bonded together, representing the smallest fundamental unit of a chemical compound. In addition, intangible assets and tangible assets we refer to as "Rarities" in the scope of the present invention, can include and form, shape, material, combination of materials, a single element, combination of elements, chemical compound of one or more elements, mineral component, synthetic component, animal component, artist (maker) biometric identifiers and all related elements which collectively creates an art asset, tangible asset and intangible asset.

In addition, a particle can refer to any relative size from an entire rarity asset for example or a tiny component, fragment, speck of the physical asset.

Furthermore, each particle collectively encompassing a tangible asset of a work of art, i.e.; coin, stamp, automobile, historical object, musical instrument, artifact, etc. can be quantitatively and qualitatively identified through one or more scientific methods.

In addition, a particle size is relative. A tangible asset can be comprised of one type of particle or material for example. Other examples include a particle to have like and similar elements woven throughout the tangible and intangible asset.

The present invention refers to the particles which comprise a partial finished or completed physical asset and components as previously described.

A molecule may be homonuclear, that is, it consists of atoms of a single chemical element, as with oxygen ($O_2$); or it may be heteronuclear, a chemical compound composed of more than one element, as with water ($H_2O$). Atoms and complexes connected by non-covalent bonds such as hydrogen bonds or ionic bonds are generally not considered single molecules. In addition, molecules as components of matter are common in organic and or inorganic substances.

The aforementioned scientific forensics and particle measurements include but are not limited to the following:

- Molecular Raman Spectroscopy (MRS)—an in situ tool that makes use of the in elastically scattered light from a laser beam that strikes the surface of the painting is preferred to X-ray diffraction because of its totally nondestructive nature. The data obtained are generally compared with reference spectra, allowing the identification of organic and inorganic pigments as well as binding media.
- Pyrolysis-gas chromatography-mass spectrometry (Py-GC-MS) is particularly useful in the analysis of the paint-binding medium. Through pyrolysis, large molecules are broken down and separated by gas chromatography. In the gas chromatograph, different components of a mixture are carried by an inert gas through a column coated with a stationary phase where they are separated. Each compound is then eliminated or "eluted" at a different time referred to as "the retention time." Information from the mass spectrometer, which is attached to the gas chromatograph, as well as from the retention times, is crucial in the identification of the components of the mixture.
- Laser desorption ionization-time of flight-mass spectroscopy (LDI-TOF-MS) identities molecular species and elements in samples based on their fragmentation patterns and on their mass.
- High performance liquid chromatography (HPLC) is another chromatographic technique used to separate a mixture of compounds and is particularly useful in the identification of organic dyes.
- Electron microscopy (SEM) coupled with energy dispersive Xray fluorescence (EDX) can yield information on the sample's topography and elemental composition. In SEM, images of the surface of the sample are produced by scanning it with a high-intensity beam of electrons. These in turn cause the emission of X-rays that characterize the elements present (EDX).
- Gamma-Ray Spectroscopy (GRS) which uses penetrating electromagnetic radiation of a kind arising from the radioactive decay of atomic nuclei.
- Sound, resonance and reverberation (SRR) testing.

Tracer Variant Polymer Emulsion (TVPE) that blends different chemical agents according to a binary code. This category includes Smart Water and Polymer Emulsion (SWPE) tracers which blends different chemical agents according to a binary code.

Ultraviolet light (UV) electromagnetic radiation with a wavelength from 400 mm to 100 nm.

In addition, the present invention also amalgamates the formerly mentioned with other scientific dimensions including but not limited to additional particle measurements:

High definition videos, photos (HDVP).

Advanced Color coding and color mapping.

Contours and convex measurements.

Other scientific analysis and particle identifiers.

Currently clever forger will anticipate scientific analysis and endeavor to avoid all the possible mistakes that would lead to the discovery of this forgery.

In addition, currently there is no multivariate scientific standard which can geometrically vett a plurality of metrics.

The definition of vetting (vett and vettinization) is the process of determining the integrity of an asset, the authenticity of an asset, the certification of an asset, the value (nominal value is an economic value expressed in historical nominal monetary terms. By contrast, a real value is a value that has been adjusted from a nominal value to remove the effects of general price level changes over time and is thus measured in terms of the general price level in some reference year (the base year). Furthermore, vettinization (noun) is define in the context of the current invention as a total vetting solution, protection, tracking and a plurality of comprehensive scientific vetting process as previously described by the present invention etc. It is understood that Vettinization can be related to not only scientific methods as previously described but also geometric correlations frequently described in the present invention.

A profile can be defined as any data which identifies, authorizes, quantifies, qualifies a tangible asset and intangible asset. In addition, an asset profile can include fundamental asset value analysis, global value analysis from one or more appraisers broker/dealers and specialist, rarity owners, industrial analysis experts, material analysis, scientific analysis, investment advisors and bankers, and related 3rd parity domestic and international organizations, entities, etc.

Geometric is defined in the context of the present invention as any correlation of micro scientific data or layers of scientific data in any form with other scientific data in any form. Furthermore, geometric in the context of the present invention also includes the computer-generated charting, mapping and plotting of any tangible or intangible asset (rarity) from several asset data points. In addition, geometric could be defined as the correlation of any type of scientific datapoints including the XY and XYZ. The surface layer of the asset and any and all inter layers of the asset.

In geometry a hyperplane is a subspace of one dimension less than its ambient space. If a space is 3-dimensional then its hyperplanes are the 2-dimensional planes, while if the space is 2-dimensional, its hyperplanes are the 1-dimensional lines. This notion can be used in any general space in which the concept of the dimension of a subspace is defined.

Furthermore, vector spaces are applied throughout mathematics, science and engineering. They are the appropriate linear-algebraic notion to deal with systems of linear equations; offer a framework for Fourier expansion, which is employed in image compression routines; or provide an environment that can be used for solution techniques for partial differential equations. Furthermore, vector spaces furnish an abstract, coordinate-free way of dealing with geometrical and physical objects such as tensors. This in turn allows the examination of local properties of manifolds by linearization techniques. Vector spaces may be generalized in several ways, leading to more advanced notions in geometry and abstract algebra.

In different settings, the objects which are hyperplanes may have different properties. For instance, a hyperplane of an n-dimensional affine space is a flat subset with dimension $n-1$. By its nature, it separates the space into two half spaces. But a hyperplane of an n-dimensional projective space does not have this property.

In geometry, a hyperplane of an n-dimensional space V is a subspace of dimension $n-1$, or equivalently, of co-dimension 1 in V. The space V may be a Euclidean space or more generally an affine space, or a vector space or a projective space, and the notion of hyperplane varies correspondingly since the definition of subspace differs in these settings; in all cases however, any hyperplane can be given in coordinates as the solution of a single (due to the "co-dimension 1" constraint) algebraic equation of degree 1.

If V is a vector space, one distinguishes "vector hyperplanes" (which are linear subspaces, and therefore must pass through the origin) and "affine hyperplanes" (which need not pass through the origin; they can be obtained by translation of a vector hyperplane). A hyperplane in a Euclidean space separates that space into two half spaces, and defines a reflection that fixes the hyperplane and interchanges those two half spaces.

The finite-volume method (FVM) is a method for representing and evaluating partial differential equations in the form of algebraic equations. Similar to the finite difference method or finite element method, values are calculated at discrete places on a meshed geometry. "Finite volume" refers to the small volume surrounding each node point on a mesh. In the finite volume method, volume integrals in a partial differential equation that contain a divergence term are converted to surface integrals, using the divergence theorem. These terms are then evaluated as fluxes at the surfaces of each finite volume. Because the flux entering a given volume is identical to that leaving the adjacent volume, these methods are conservative. In physics and mathematics, the dimension of a mathematical space (or object) is informally defined as the minimum number of coordinates needed to specify any point within it. Thus a line has a dimension of one because only one coordinate is needed to specify a point on it—for example, the point at 5 on a number line. A surface such as a plane or the surface of a cylinder or sphere has a dimension of two because two coordinates are needed to specify a point on it—for example, both a latitude and longitude is required to locate a point on the surface of a sphere. The inside of a cube, a cylinder or a sphere is three-dimensional because three coordinates are needed to locate a point within these spaces.

In classical mechanics, space and time are different categories and refer to absolute space and time. That conception of the world is a four-dimensional space but not the one that was found necessary to describe electromagnetism. The four dimensions of spacetime consists of events that are not absolutely defined spatially and temporally, but rather are known relative to the motion of an observer. Minkowski space first approximates the universe without gravity; the pseudo-Riemannian manifolds of general relativity describe spacetime with matter and gravity. Ten dimensions are used to describe string theory, and the state-space of quantum mechanics is an infinite-dimensional function space.

The concept of dimension is not restricted to physical objects. High-dimensional spaces frequently occur in mathematics and the sciences. They may be parameter spaces or configuration spaces such as in Lagrangian or Hamiltonian mechanics; these are abstract spaces, independent of the physical space we live in.

Correlation is defined as a coefficient that elucidates a quantitative measure of some type of correlation and dependence, meaning statistical relationships between two or more random variables or observed data values. It is understood by anyone familiar with the art that there are degrees of correlations and in some cases zero correlations or relationships when measuring a like or similar measurements pertaining to a rarity asset.

Coefficient a multiplier or factor that measures as it relates to tangible assets.

The definition Eukaryotic cells, chromatin is a complex architecture resulting from the association of DNA, histones, non-histone proteins, and RNA. The dynamic organization of the chromatin components regulates processes that are essential for normal cell physiology. Generally, the participation of DNA and RNA in FTIR cell signatures is assumed from the vibrations of the nucleic acid phosphate groups and is particularly considered as one of the important biomarkers. The changes in the nucleic acids as assessed by IR signatures are promoted by factors at the molecular level of these compounds, such as, the presence of extensive hydrogen bonding, an increase in symmetric phosphate stretching that indicates tighter nucleic acid packaging, and a decrease in the hydrogen bonding of associated C—OH protein groups. It is thus relevant to expect the influence of cations on the IR signatures of the phosphate anions even in inorganic phosphates used as models, and the influence of histone cationic groups—or at least of the reductionist models of lysine-rich and arginine-rich histories, such as poly-L-lysine (polyL-K) and poly-L-arginine (poly-L-R), respectively, which bind electrostatically to the DNA phosphates—on the DNA FT-IR spectral profiles. Indeed, FT-IR studies have demonstrated that histone-mimicking cationic dendrimeres, which are potential transfection agents for gene delivery, strongly aggregate calf thymus DNA via major and minor grooves and the backbone phosphate groups of the nucleic acid. Spectroscopic studies on ligand-phosphate binding in complexes between drugs (e.g. saffron components) and DNA have revealed an increase in intensity of phosphate-stretching vibrations and a certain degree of helix destabilization and drug intercalation.

Rarity (Rarities) are defined as any tangible asset or intangible asset. The present invention is intended for use with all art assets which are tangible in nature. Representative tangible assets as used in this invention, in one preferred embodiment, include paintings, drawings, sculptures and photographs. In another embodiment, representative assets could also include rare books and manuscripts, historical sites, furniture (antiques) and decorative arts, rare stamps and coins (both rare coins, bullion, precious metals, precious stones and other and all types of like commodities) ancient artifacts, pottery and glass, ceramics and other tangible assets. Assets, in still another embodiment, may include any type of coin, gold coins, platinum coins, silver coins, gold dusts, silver dusts, platinum bars, gold bars, genuine gold, karat gold, rubies, emeralds, diamonds, simulated diamonds, genuine platinum, karat platinum, paintings, precious metal, precious alloys, precious metals, precious ores or concentrates, antique coins, and rare coins, for example.

As a broad example, "art asset" as used herein further refers to any and all forms of tangible assets which have value, such as, but not limited to, the works by art masters, primary art work, secondary art work, fine arts, contemporary works and modern works; of any historical period, cultural and geographical style, design and type. Assets may also include educational materials, scientific materials, electronic books or libraries, music memorabilia, sheet music, records, movies, films, motion pictures, compact discs, digital video discs, musical instruments, entertainment devices or any type of intellectual property. An asset may also include tangible collectibles which have value, such as, but not limited to, ancient historical artifacts, memorabilia, weapons, toys, stamps and coins (both rare coins, bullion, precious metals, precious stones and other and all types of like commodities), paper money, possessory money, sports memorabilia, musical instruments, costumes, entertainment memorabilia, scientific and engineering memorabilia, maritime objects, wartime objects, transportation objects, arms and armatures, antiquities, governmental collections and archives, private historical properties, governmental real property and monuments, school and institutional assets, auction and consignment assets, private collections, library assets, and other valued public and private collectibles.

The present invention is intended for use with all art assets which are tangible or intangible in nature. Representative tangible assets as used in this invention, in one preferred embodiment, include paintings, drawings, sculptures, photographs and motion pictures. In another embodiment, representative assets could also include rare books and manuscripts, historical sites, furniture (antiques) and decorative arts, rare stamps and coins (both rare coins, bullion, precious metals, precious stones and other and all types of like commodities) ancient artifacts, pottery and glass, ceramics and other tangible assets. Assets, in still another embodiment, may include any type of coin, gold coins, platinum coins, silver coins, gold dusts, silver dusts, platinum bars, gold bars, genuine gold, karat gold, rubies, emeralds, diamonds, simulated diamonds, genuine platinum, karat platinum, paintings, precious metal, precious alloys, precious metals, precious ores or concentrates, antique coins, and rare coins, for example. As a broad example, "art asset" as used herein further refers to any and all forms of tangible assets which have value, such as, but not limited to, the works by art masters, primary art work, secondary art work, fine arts, contemporary works and modern works; of any historical period, cultural and geographical style, design and type.

Assets may also include educational materials, scientific materials, electronic books or libraries, music memorabilia, sheet music, records, movies, films, motion pictures, compact discs, digital video discs, musical instruments, entertainment devices or any type of intellectual property. An asset may also include tangible collectibles which have value, such as, but not limited to, ancient historical artifacts, memorabilia, weapons, toys, stamps and coins (both rare coins, bullion, precious metals, precious stones and other and all types of like commodities), paper money, possessory money, sports memorabilia, musical instruments, costumes, entertainment memorabilia, scientific and engineering memorabilia, maritime objects, wartime objects, transportation objects, arms and armatures, antiquities, governmental collections and archives, private historical properties, governmental real property and monuments, school and institutional assets, auction and consignment assets, private collections, library assets, and other valued public and private collectibles.

It is understood by anyone familiar with the art that scope, range, size of any particle, dimension (2d/3d etc.) and scientific measurement as previously described can be compared in relationship to a plurality of other asset measurements, positions pertaining to the asset.

Definition of RFID communication. There are four frequency bands for RFID communication varying from low frequency, high-frequency, ultra-high frequency and microwave. The appropriate frequency for the RFID-enabled smartphone depends on the range required by the application for which it is going to be used. High-frequency bands that allow communication in a few meters are expected to be appropriate for the RFID enabled mobile or fixed devise. More specify the appropriate frequency ranges in different parts of the globe causing incompatibility issues between tags and RFID readers. The current, invention enables RFID equipped smartphones to interface multiple standards, protocols and platforms utilized for protecting the rarity asset throughout the online buy-sell process and as described in detailed by our International patent application No. 2013/051082. [Technical Solution to Problem].

Monitoring and tracking of assets might be achieved through radio frequency identification (RFID) technology, radio tags, optical emitters and the like. RFID technology might be integrated with a wireless smartphone or other mobile device enabling reading of, and interaction with, active and/or passive RFID tags as well as with databases containing information related to the assets. The wireless smartphone might interface one or more other mobile devices within a system comprising RFID readers, RF tags, and environmental sensors.

Statistics is the study of the collection, analysis, interpretation, presentation, and organization of data. Statistics deals with all aspects of data including the planning of data collection. Two main statistical methodologies are used in data analysis: descriptive statistics, which summarizes data from a sample using indexes such as the mean or standard deviation, and inferential statistics, which draws conclusions from data that are subject to random variation (e.g., observational errors, sampling variation). It is obvious that scientific measurements as it relates to tangible assets can be studied, collected, interpreted, presented and organized.

The present invention helps resolve several issues which are problematic to both buyers and sellers of tangible assets and consumer goods when sold through traditional online websites. The current model for selling and trading valuable tangible assets on Internet is through website such as ebay and hundreds of other online web services. However, online services are not properly vetted nor in the proper forum for high value asset (rarity) exchanges. The Internet in general is a hotbed of fraud schemes, and eBay and other online merchandisers are a microcosm of the Internet transactions. Anonymity provides an easy path to cheating people out of money.

The current online merchandising model has four main sections to any auction page. Title/Overview—This is where you see the basic information, like auction title price, shipping price, seller information and how many bids have been placed so far. Description—This is where the seller provides details about the item. Shipping, payment and return policy—This is where you can find full shipping information, any details the seller wants a bidder to know about making payment (including which methods are accepted) and what the seller's return policy is. Bidding—This is where you place a bid on the item.

There are many examples of fraudulent transactions on popular sites such as eBay for example. Amazon and ebay and other online services which sell primary and secondary merchandise work off an old model which is not designed for high-value assets. It is obvious to anyone familiar with the art that high-value assets must utilize and develop a new model whose architecture is designed to protect the asset and buyer and seller. The following descriptions (reference 18 & 19) detail the current problems with conventional online merchandizing.

Online merchandising even when using the services of Paypal, can easily be the victim of the Paypal Chargeback Scam. In addition, Ebay's "Seller Protection Policy" will not protect a seller because the buyer will say the item was not as advertised, and that is not covered, as their policy clearly states.

There are two main ways in which a buyer can be defrauded by a seller: The item the buyer purchased is dramatically different from how it was described in the listing; or the item simply never arrives. In addition, there are a multitude of examples of online fraudulent transactions:

A customer will not be able to contact buyers' credit card company to tell them you have not received the item back, because Paypal considers that contact information confidential.

Paypal will not help you or stand behind you with the credit card company.

Paypal will not require the buyer to send the item back. They typically immediately side with the buyer and against the seller, while telling you they are working to help you.

You will not be able to leave negative feedback about the buyer on eBay because eBay's 60 day time limit will have expired.

The buyer will get the money back and be able to resell your item. You will be out your item and will have to refund the selling price back to Paypal.

You can provide proof that the item was received and you will still lose, because the scam artist knows to claim that the item was "not as advertised".

Ebay and other online companies do not proactively accommodate asset management since the companies are structured for high volume of sales of lower cost merchandise. Higher cost items and assets are untrusted with no asset no structural and administrative vettinization process in place. Current online merchandisers only accommodate the customers' needs after you file a complaint and have a dispute (i.e., eBay's "Item Not Received or Significantly Not as Described" system.

Currently, other online merchandisers including eBay logistics system and warehouses are equipped to only ship merchandise or equipped to be an online wholesaler of merchandise.

Similarly, the online sector of auction houses such as Christies and Sotheby's business model is outmoded and have large buyer seller commissions. Presently they're online services do not protect the long-term legacy of the rarity but merely sells the item in the item in the same manner as Amazon and other online services. In addition, big auction houses use forensics to verify the authenticity of a rarity, value the rarity and certify the rarity but stop short of protecting the rarity threw new technology.

For propose of the invention: high-value assets are defined as the assets which are at a subjective value of high risk for the buyer. In other words, most buyers have different earnings and net worth and thus in corresponding have variant and proportional risks. It is understood by anyone familiar with art. Time Value of Money (TVM), inflation/deflation variations, International Exchange Rate and/or various country's monetary valuation, such as €, £, ¥, ₿, etc. could be interpreted as the equivalent of for example $1000 USD as a baseline asset value. It is understood by anyone familiar with the art that the baseline is relative to the shipment cost, trading cost, overhead cost and other costs related to the analysis of the physical asset.

For propose of the invention: rarity assets are defined as one or more tangible or intangible asset or one or more pool(s) of tangible or intangibles assets.

For propose of the invention: an auction house is defined as an organization buying and selling goods or services by offering them up for bid, taking bids, and then selling the item to the highest bidder. In economic theory, an auction may refer to any mechanism or set of trading rules for exchange.

For propose of the invention: internet marketplaces, such as but not limit to, ebay. It provides consumer-to-consumer & business-to-consumer sales services via internet. It acts as an online auction and shopping website in which people and businesses buy and sell a broad variety of goods and services worldwide. Internet market-place acts as a webased auction-style sale forum, which has security concern, high cost and inconvenience to buyers and owners. Market requests a new way of exchange high-value asset.

The present invention relates to software which is adapted to obtain, control, maintain, and coordinate various investment methodologies for stagnate, underutilized not utilized tangible asset or assets that have a monetary value. Typically, many tangible assets of value (e.g., art paintings, rare sculptures) are either stored, or exhibited in art museums, or are owned by governmental controlled collectibles, libraries, art and antiquities dealers, auction and consignment houses, galleries or in other private and other public collections (generally referred to herein as the "art holders"). In some cases, these art holders exhibit the art asset to the public (such as, for example, a museum). In other cases, these art holders will showcase the art only to selected individuals or groups due to the uniqueness, monetary value or historical value of the art asset (such as, for example, the artifacts found with or alongside the King Tut collection). In still other cases, some art holders decide not the showcase the art asset at all, and instead, place the art asset in private locations (such as a rare painting placed or stored in a residence or storage).

In many cases, museums warehouse a large percentage of their art assets for display within the museum as an exhibit, gallery or other forms of display to the general public. However, while the art asset may be valuable and increasing in value with time, museums typically have a hard time taking advantage of the value or increasing value of their art assets. Indeed, it is well known that museums are continually in search of financial sources to maintain its art asset collection, obtain new art asset collections, and/or obtain funding to either increase the size of the museum or increase the type of events offered to the public. Stated differently, private collectors, owners of rarities, owners of historical properties, public collectors, art museums, historical museums, transportation museums and other types of museums or owners of assets having inherent value currently raise capital for purchasing art work, investing in new exhibits and for general working capital needed for the curators, directors, workers and security teams needed to operate the museum. Rarities, as that term is used herein, includes those items whose value is based on historical presence, or one which is typically non-reproducible and having a value due to its uniqueness. In addition, the rarity exchange process could sell rarities wholly or in fractional shares.

Additionally, it is difficult for the art holder to sell or transfer art to other art holders because there is no centralized system in which to offer and/or view art assets which are available.

Moreover, prior to the present invention, high-value assets are valued, verified for authenticity, appraised etc., through the seller in order to list a price through various online selling sites. Furthermore, the verification of authenticity is not mandatory for most ecommerce listings. In addition, the certification of authenticity could be fraudulent, come from unknown and or unqualified sources and be selective in nature to only show the values which favor a higher price for the seller.

The grading and valuation process includes the analysis and methods of authentication regarding rarity assets greatly vary. Several criteria, the most important being the quality, the rarity, the interest, factor, and the liquidity factor.

Currently there is no overall system in place which domestically and globally protects assets not only throughout the buy-sell process but throughout the asset's historical legacy process. In other words, connecting, linking, a secure vettinization process in order to preserve, protect not only the asset but throughout subsequent buying and selling transactions. The GRV system creates a secure geographical rarity asset protection and preservation system and standard which assists appraisers which no way of centrally sharing appraisal values with other appraisers or viewing a central repository of such information).

SUMMARY

The present invention enables owners' sellers of high value assets and buyers of high value assets to coalesce The present invention relates to a high-value asset exchange, clearing house and protection system; specifically, a system with authentication technology, tracking, computer generated forensic geometric relativity and geometric pixelated (molecular) relativity as it relates to title transfer.

In addition another embodiment of the present invention scientifically identifies one or more particles of a tangible or intangible asset and compares the similar and dissimilar particle chemical elements, identifies the location of the particles within the asset, measures one or more layers of the particle's chemical compensation and XY and XYZ location specifications.

In addition another embodiment of the present invention through computer Particle Asset Mapping (PAM) mathematically and geometrically maps one or more particles, registers the PAM results as well a scientific data for each particle. The computer then generates a PAM amalgamated particle correlation which identifies a plurality of symmetric and asymmetric, similar and dissimilar elements of one or more particles. In other words, for example if an art work contains paint which has traces of a certain type of resin and solvents in the paint, the computer will generate a mapping process using scientific chemical correlation to various degrees (standard deviations of concentration) and resin and solvents in order identify and map the presence of the particle.

PAM can also compare and geometrically compare particle correlations through a 2D or 3D 360 process which can search a single particle chemical bond or component or multiple types of particle components, contours, colors and other identifiers in various levels an layers of the asset.

In addition to PAM could utilizes artificial intelligence and programming which ID's frauds, specific correlations and elements of one or more particles or a random or automated and encrypted PAM results which can be registered and logged into an historical database to help prevent fraudulent activity, forgeries, bait and switch, asset age, environmental deterioration, asset misrepresentation and other important criteria which can be used for future online buy-sell and trading for high value assets.

In addition, the PAM can securely dynamically be changed in order to identify one or more elements of previously logged particle identifiers to satisfy more restrictive due diligent processes.

In addition, the GRV and PAM system includes a software toolkit system which can be suitable for rarity investments, secure rarity online trading and rarity vettinization on one or more buyer-seller exchanges.

In addition, the GRV and PAM toolkit system includes a seller and buyer registration process which will utilize one or more scientific or technical datasets which authenticates, certifies and vets tangible assets for listing on the online trading exchange. In other words a seller and buyer registration process will enable a valuable historical legacy of assets for both the primary exchange process, offering and secondary trading and subsequently exchange processes.

On or more rarity collectables, tangible assets, intangible asset could be self-managed and listed individually, traded through a SEC registered fund, traded the form of an investment vehicle through an IPO or secondary marketplace, etc.

In addition the toolkit software designed specifically for tangible and intangible assets could be licensed to 3$^{rd}$ party online merchandiser in order to help reduce risk and fraud for buyer and sellers of said rarity assets.

The present invention relates to a high-value asset exchange, clearing house and protection system; specifically, a system with authentication technology, tracking, computer generated forensic geometric relativity and geometric pixelated (molecular) relativity as it relates to title transfer.

The present invention is a true invention which is designed to protect, log and trace the rarity (tangible and intangible assets) not only through one buyer-seller transaction but throughout the historical legacy of the asset, through many subsequent secondary purchases and provides the first multilayered, multifunctional and multivariate approach to prevent fraud, theft and detecting detrimental environmental and transformational detrition.

In one embodiment of the present invention, the GRV system creates multilayered data points primarily which are embedded on or within the art asset.

The present invention aims to assist such art holders by providing art asset owners (and potential art asset owners) a computerized method and system for (without limitation) storing, sharing, selling or owning art assets on a worldwide basis, while at the same time providing sufficient liquidity in the art asset.

Moreover, the present invention aims to assist art holders with initially identifying the appraisal value of the art asset through a grading process with input from appraisers from throughout the world to provide numerous appraisal data points in a central repository database, and through subsequent public demand, move the initial appraisal value of the art asset in to a market driven value, thereby significantly increasing the overall value of the art asset or art asset pool. Additionally, the present invention will help combine an art holder's desire to obtain additional financing with a party who desires to obtain an ownership interest in art without having to worry about physically storing or maintaining the art, and allows the art investor to more appreciate the art because the art investor is now a part-owner of the art.

One common problem among art owners is that they desire additional funding based on the art asset, but they do not want to relinquish physical control, possession or entire ownership over the art asset. The present invention solves this problem by allowing the art holder, through the implementation of a computer software system, to obtain financing from one or more investors for an ownership interest one or more art assets, while still allowing the art holder to maintain physical possession and control of the art asset. Thus, in the example of a museum, the museum may give up some ownership interest in the art asset while being able to maintain physical control and possession of the art asset (thereby, allowing the public to continue to view and appreciate the art asset). As recited throughout this invention, this invention is not limited to a single art asset, but can be applied to numerous art assets which are placed collectively into an art asset pool.

Thus, the present invention provides the ability for an investor to invest not only in a single art asset, but to invest in one or more art asset pools. By analogy, the present invention is directed towards creating a mutual fund for art investors, allowing the art investor to obtain ownership rights in an art asset (or, art asset pool) without obtaining possessory rights of the art asset (or, art assets in the pool).

As those of skill in the art will now come to realize, an art asset may comprise a single asset (such as a sixteenth century gold coin), or may be combined (or, pooled) with other art assets (such as sixteenth, seventh and eighteenth century gold coins), whether or not similar in nature (such as, for example, sixteenth, seventh and eighteenth century gold coins combined with sixteenth, seventh and eighteenth century paintings). Thus, the present invention allows for inventive adaptability, so that depending upon user input, each art asset pool will have a unique art asset characteristic which may be desired by art asset investors. Making an ecommerce listing currently entails basic information such as Item title, item description, URL of the item page, whether the item is orderable, current price, availability, item number, shipping cost (if specified ahead of time), gallery picture (if available), quality and currency.

forensic information to be electronically collected, stored or transferred to emergency personnel and/or other organizations in order to help prevent further injury or to gather information about the emergency. Additionally, "emergency situation" can also affect tangible and intangible assets, but emergency warning systems employing mobile technology do not integrate monitoring and warning of emergency situations that might be associated with these assets.

Embodiments of the present invention might be employed to aid in safety and protection of property including tangible objects or intangible objects of any value, importance, or personal interest, intangible or tangible property or asset might be monitored and tracked both when stationary o in motion. Monitoring of assets might be conducted through a constant or periodic evaluation of various environmental occurrences or other events that occur outside of a predetermined acceptable range. Occurrences or events thus occur outside of an optimal asset safety range or are otherwise deemed to be unacceptable might trigger sending of an alert.

Described embodiments relate to various aspects of devices, systems and methods for safety and protection of tangible and intangible assets that might be integrated within a mobile technology-based safety and warning systems when an asset is exposed to negative environmental conditions or situations regarding fraud. Hereinafter, exemplary embodiments are described with reference to the drawings.

High-value rarity ownership exchange system could be defined by one embodiment as the abilities, such as but not limit to, exchange, certify, appraise, store, transport, label, tag and tracking, etc. The GRV communication system can be based on Wi-Fi and/or cellular server and/or cloud network could be utilized for training or learning from one or more mobile devices or fixed devices. This virtual tutorial could be utilized both in real-time with one or more users. It's obvious for anyone familiar with the art, these portable devices could be utilized for music or instructional learning, voice or holographic or any other multi-media transmitted to any cloud or servers or sub-servers.

Other embodiments of the present invention as detailed in later descriptions include:

- The integration of various scientific measurements on or embedded in one or more layers of the rarity.
- The geometric integration of locator technologies correlating to the scientific findings.
- The integration of the creators' DNA/RNA on or embedded in one or more layers of the rarity.
- The geometric integration of locator technologies correlating to DNA.

Furthermore the GRV computer system transmits and encrypts a plurality of scientific measurements and it's corresponding emitting locations in order to add a high degree of complexity in order to prevent fraud and illegal copying. The GRV system also utilizes the actual DNA of the asset creator to further add complexity to the mix of scientific measurement variables and its corresponding locators. For example, a Smart Canvas, Smart chemical nanoparticle fabrication, smart chemical nanoparticle as it relates to the identification and association of the creators of a work of art, microprocessor particle locator positioning for tangible assets.

In another embodiment, the system can detect distinguishing particle features. Including but not limited to the generated geometric particle to particle geometric correlation.

Another embodiment system comprising of high-definition particle to particle visuals, depth, material structure, composition, forensic analysis, algorithmic corrections and other distinguishing micro particle transcripts and material rarity correlations.

GRV information is securely transmitted and provides a dynamic descriptor software (key code authorized rarity title holders or authorized personal. In addition, yet another embodiment, bi-directional communication in real-time, near-time.

Warning alerts through RFID attached or in proximity to the rarity asset could be sent to authorized personnel through the secure server and GRV and PAM network.

In addition, the GRV and PAM computer processor could prevent rarity theft by dynamically generating and regenerating geometric encryption/decryption codes:

- Which can sort and categorize one specific scientific measurement as it pertains to one location on or within the asset.
- Which can sort and categorize more than one scientific measurements as it relates to more than one geometric locations on or within the asset.
- Which can geometrically locate and detect embedded DNA molecule.
- Which combines any and all required scientific and DNA information specially designed for the type and classification of rarity.

The GRV and PAM system could enable asset owners or authorized 3rd parties to manually identify a plurality of scientific variables best stated for securing the rarity asset.

The GRV and PAM system is a dynamic method and system to prevent the epidemic of illegal copying and forgeries which plague the trading and exchange process of rarity assets.

BRIEF DESCRIPTION

FIG. 1 shows a representation exemplified of the communication control system as it relates to Geometric Vettinization in accordance with the embodiments of the present invention.

FIG. 2 exemplifies geometric 2d correlations as it relates to a multitude of scientific measurements in the accordance with the embodiments of the present invention.

FIG. 3, exemplifies geometric 3d correlations as it relates to a multitude of scientific measurements in the accordance with the embodiments of the present invention.

FIG. 5 is an example of a rarity secure online exchange warehouse and data exchange system in accordance with the embodiments of the present invention.

FIG. 6 is a representation of a robotic device which houses various scientific equipment designed to measure and collect a rarity asset's scientific data in accordance with the embodiments of the present invention.

FIG. 7 is a representation of a creator's embedded biomarker identification in accordance with the embodiments of the present invention.

DETAILED DESCRIPTION

Figure 1:
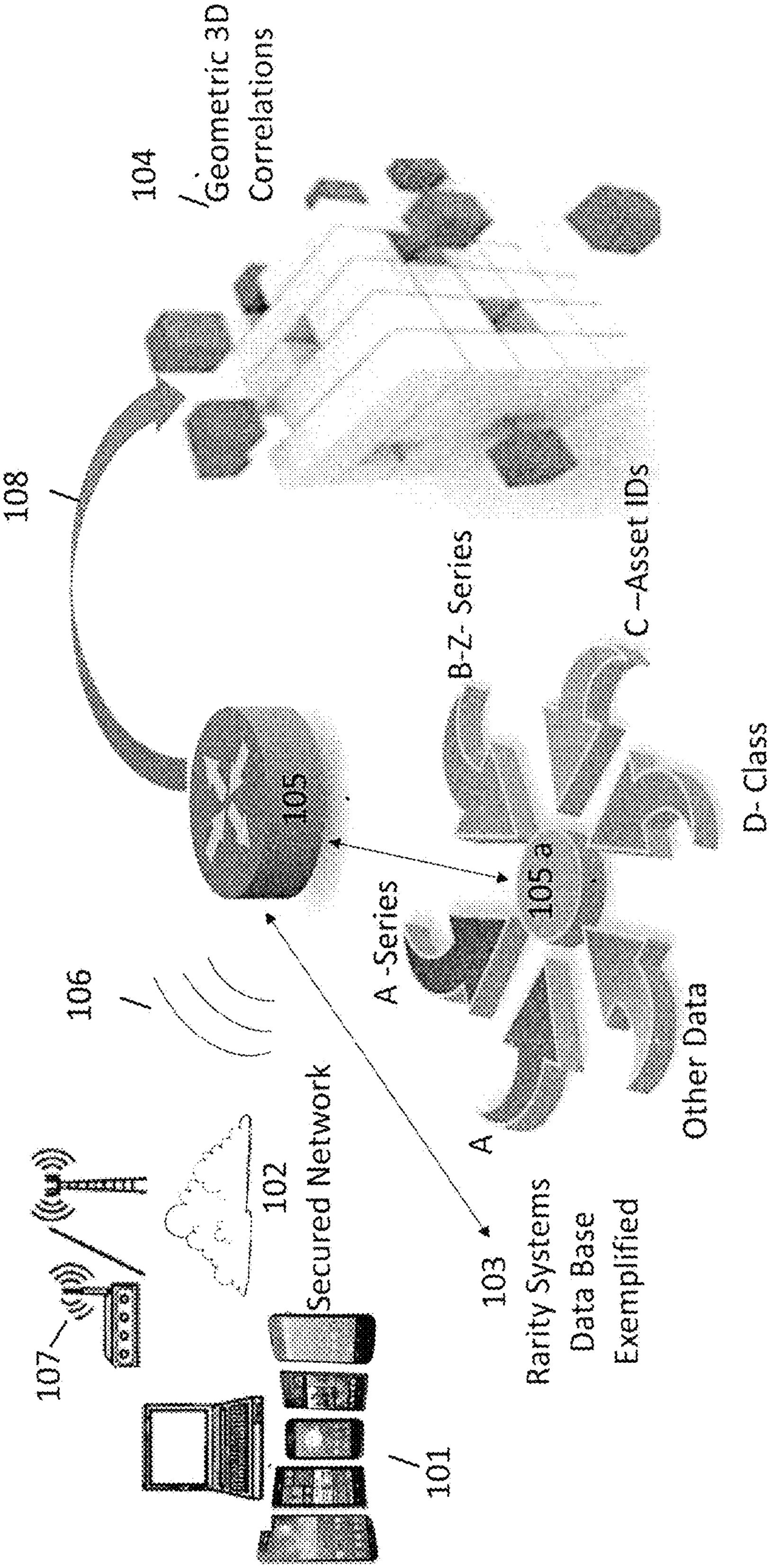
Figure 2:
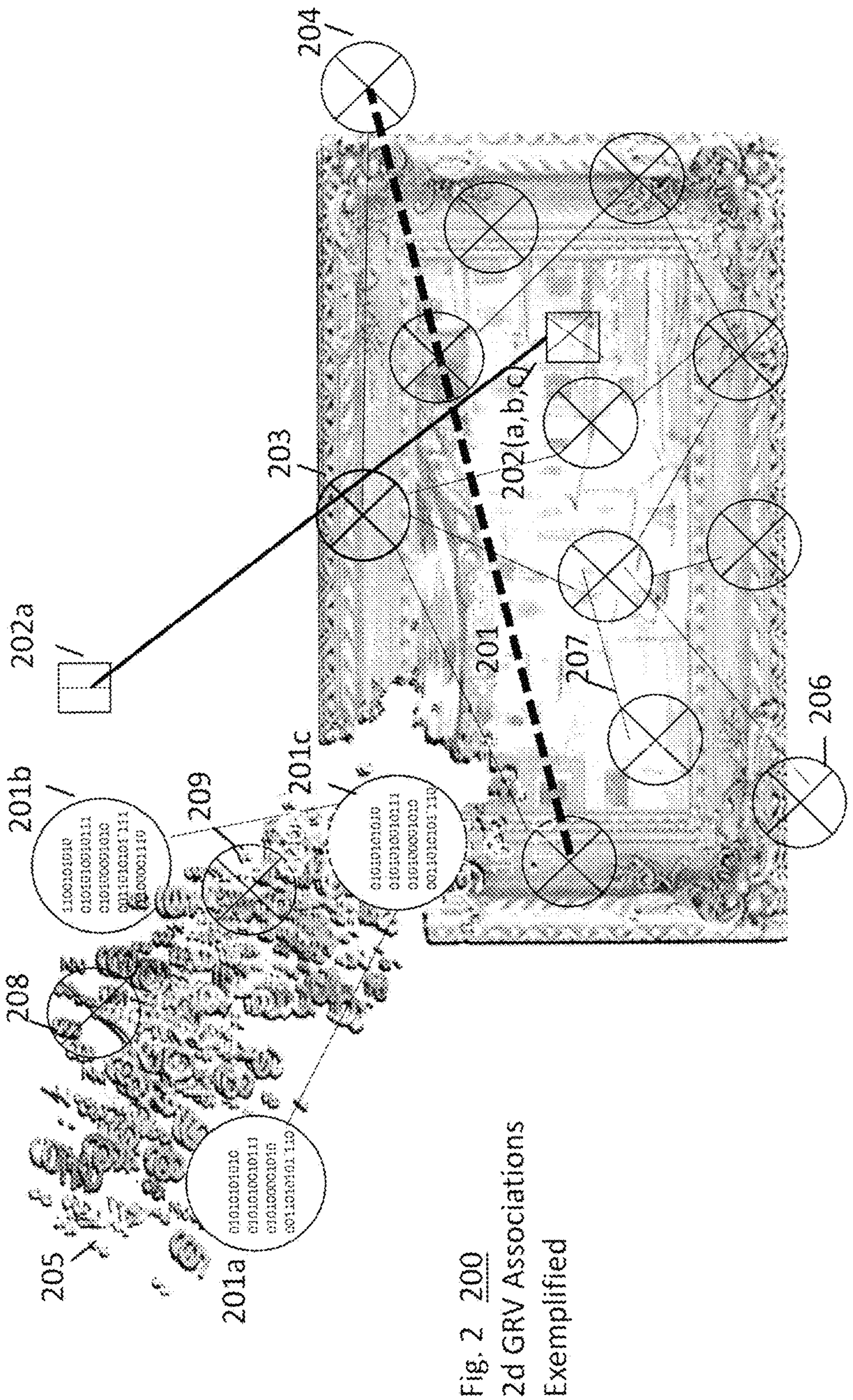
Figure 3:
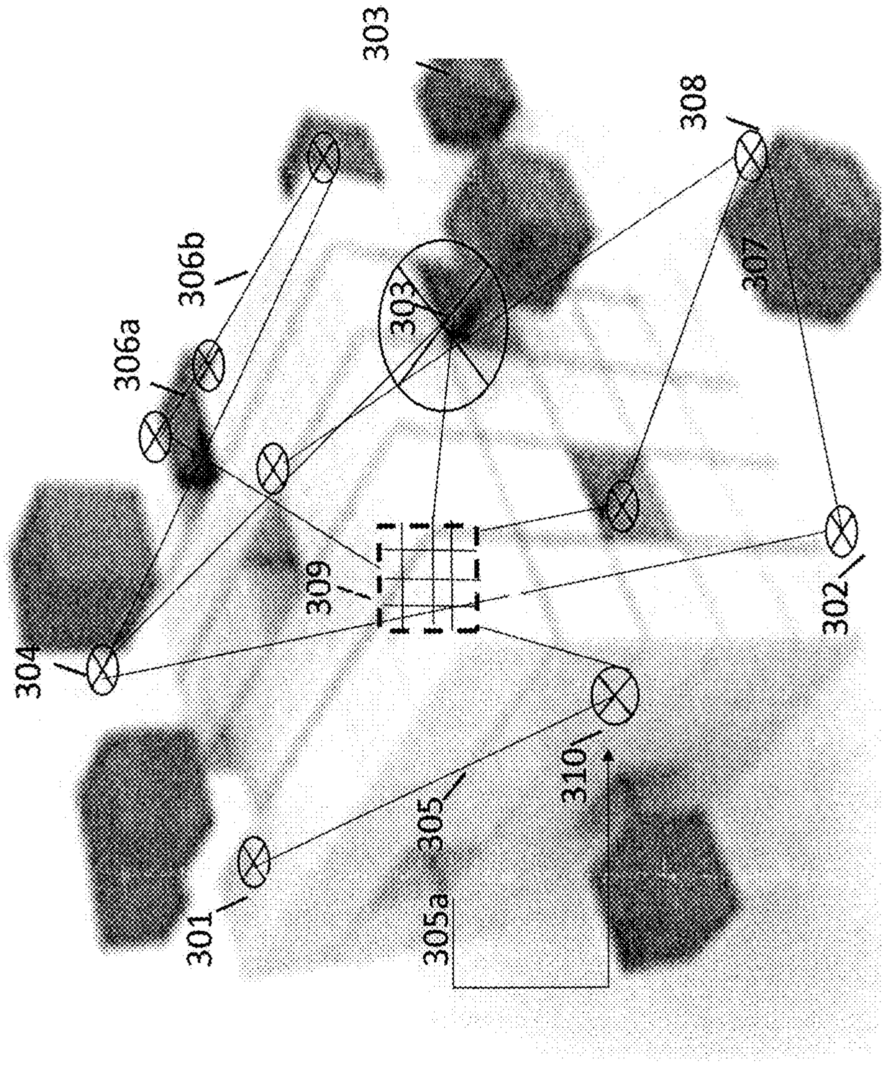

FIG. 1 represents mobile devices as it relates to all secure networks and 104 the Geometric Correlations (GC) communication model showing an exemplary rarity exchange network and subnetworks which comprises of the integration of a dynamic wireless and wireland network utilized for trading rarity assets; Rarity assets FIG. 105, represents the informational database for one or more rarity assets, rarity classifications, rarity sub classifications and all forms of tangible and intangible assets. Rarities as previously described include valuable tangible assets which could be defined any and all classification of rarity assets such as for example; coins, gems, fine art, rare vehicles, antiquities, antiques, time pieces, musical instruments, precision instruments, historical designs, architectural renderings and structures, and special collections, sports and entertainment memorabilia, athletic contracts, equine related sports i.e. racehorse fractional share ownership, robotic entertainments, rare books, rare documents, autographs, fine wines and spirits, recovered treasures and other man/woman-made rarities, environmental, geological and archeological rarities, historical artifacts, documents and all other tangible and intangible assets (copyright, brands, trademarks, IP, etc.). In addition. FIG. 105*a* represents an example of an index of rarity classifications and sub-classifications, and they're component parts such as for example, geometric correlations as previously described, a plurality of scientific information regarding the asset high definition 360° images and video and other identifying secure data (PAM) such as previous described. It is understood by anyone that is familiar with the art that the Rarity Trading Platform Network (RTP) can exchange ownership rights between buyers and sellers of both fractional shares and wholly owned rarity assets. Fractional ownership of one or more rarity assets is based on a percentage of equity, preferred or common stock or ownership units offered to more than one buyer, partnership, organization etc. It is understood by anyone familiar with the art that RTP can function in part or throughout the buy-sell trading process. FIG. 107 shows the secure communication network accessed through mobile smartphone or other PC devices. An investment agent is defined as a person who acts on behalf of another when investing for example in Rarity fractional shares. The Rarity Trading Platform component of the invention could be networked in order to receive or send a multitude of Rarity Asset information, through any type of secure wireless connection FIG. 102 and mobile devices such as (smart watch, smart wearables, smart phones, smart tablets etc.) as shown in FIG. 101. In addition, FIG. 102 represents the trading platform between buyers and sellers through a plurality of servers, backend servers and sub-servers reference in FIG. 106, the API cloud network, etc. which accounts for any exchange transaction or process, certifies any RTP transaction managed in conjunction with a 3$^{rd}$ party through the secure developer's tool kit or through its own mechanism, including but limited to infrared devices which could transmit and disseminate RTP information through the network for all types of trading purposes. It is obvious to anyone familiar with the rarity asset the network could be composed of any wired means as well as wireless in order to send and receive alerts and other information. FIG. 104 shows an example of a 3$^{rd}$ object (rarity asset) and correspondingly represents component part and scientific measurement of the rarity. These component parts scientifically measurable input and data can be one scientific finding or a multitude of scientific finding of any scale and any type of measurement. FIG. 2 and FIG. 3 describe the present invention's significance as it relative to the next generation of anti-fraud technology when buying or selling rarity assets. In addition, FIG. 2 represents a 2d comparative while FIG. 3 represents a 3d comparative of a plurality of scientific data measurements of any scale, measurement, comparable for or dissimilar form. In addition, the above components are in accordance with the embodiments of the present invention.

Figure 4:
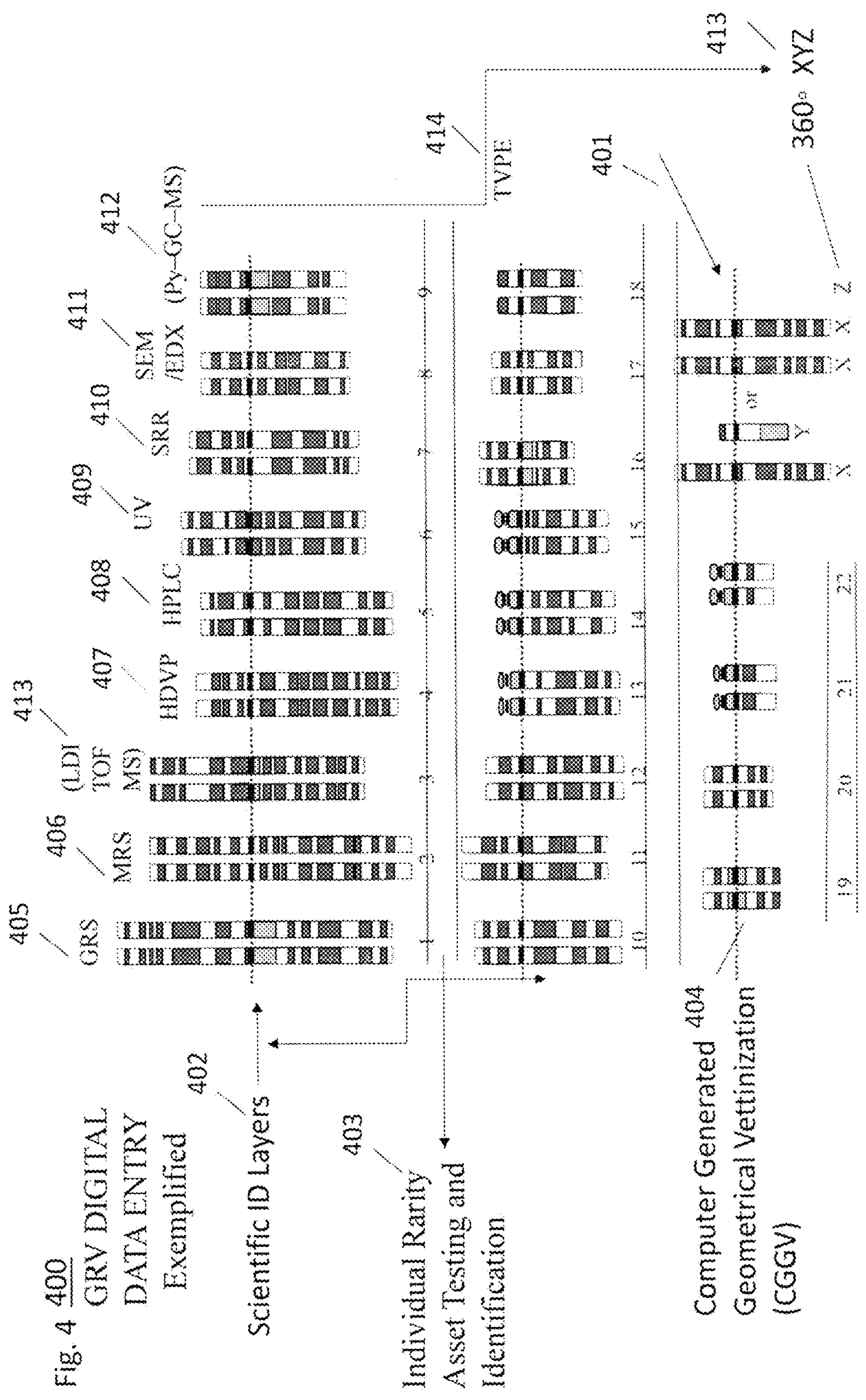
FIG. 4 shows GRV digital entry of various components as it relates to a plurality of XY and XYZ 360° to scientific and geometric correlation measurements in accordance with the embodiments of the present invention.

FIG. 2 represents mobile devices as it relates to an example of 2 dimension Geometric Rarity Vettinization associations. As previously described scientific association and correlations as it relates to assets can categorize a multitude of variants. Scientific variants, physical variants and measurements could range from an exact match to a zero match or anything in between. In addition, deviations of any one scientific measurement with a like measurement in one embodiment of the present invention could originate from one or more locations on the surface or under the service of the asset. FIG. 2 200 represent s an example of a rarity asset (tangible and intangible assets) as previously described in the present invention. 201*a,* 201*b* and 201*c* exemplify the digital convergence of scientific measurements if in analog format. In addition, these scientific measurements care coupled with the exact micro location of the originating data from various geometric locations on the 2d surface of the asset. The scientific measurements could be entered manually or automatically entered into the database and sorted in multiple ways. For example, sorted by the type of measurement including but not limited to Pyrolysis-gas chromatography-mass spectrometry (Py-GC-MS), Molecular Raman Spectroscopy (MRS), Laser desorption ionization-time of flight-mass spectroscopy (LDI-TOF-MS), Electron microscopy (SEM), High performance liquid chromatography (HPLC), Gamma-Ray Spectroscopy (GRS), Tracer Variant Polymer Emulsion (TVPE), Sound, resonance and reverberation (SRR) testing. Ultraviolet light (UV) electromagnetic radiation, Digital High definition videos, photos (HDVP), Electron microscopy (SEM) coupled with energy dispersive Xray fluorescence (EDX) and other scientific measurements. In one embodiment, 208 and 209 represents an example of exact scientific variables. In other words, the same measurement such as for example, the exact same color codes when searching for the exact color, contour, imperfection etc. 201 (201*a* 201*b* and 201*c*) exemplify like scientific matches which are then digitized as a data entry as shown in FIG. 4. 203, 204 and 206 represents a scientific measurement which have certain emission properties such as gaseous properties for example. It is obvious to anyone familiar with the art that any and all combinations and locators of the said scientific datapoints could be exemplified. In addition, 204 represents an example of an exact match with one or more scientific variables as shown by the bifurcated line. 203 represents a related scientific measurement match outside of the center of the scientific measurement and 202, *b, c* characterizes a combination of variable scientific matches as it relates to geometrical asset locators. 202*a* represents scientific datapoints not in range or not measured on the tested asset, but could be analogous to other like assets. 201*a,* 201*b,* 205 and 208 and 209 represent examples of digitized scientific fractionalization where information, exchange values and other data is transmitted to authorized personnel. 207 represents the linier geometric link from one scientific measurement and the other. It is obvious to anyone familiar with the art that thousands of combinations of scientific measurements could be exemplified for both 2d and 3d as described by FIG. 3. in another embodiment the exact comparison as exemplified by FIGS. 208 and 209 amalgamates the precise location or locations of one or more scientific measurements externally or internally made. In another embodiment the asset locator measurements comparatives can locate a plurality of scientific measurements for both 2 dimensional and 3 dimensional asset locator technology. Asset location technology.

FIG. 3. Shows a 3d GRV rendering which illustrates similar properties as the 2d illustration however concentrating in 3d scientific measurement results and 3d locators. For example, the linear pathway between the scientific measurement and the locator comparative(s) in the 3d format is represented by the 3d pathway 305 and implemented as illustrated between 3d XYZ coordinates 301 and 310, 303 and 307 exemplifies like molecules, exact matches, exact or near exact visuals or other scientific variables. 305 represents molecules which border the exact match (303 and 307) or intersect the exact match or contain elements of the 302 exemplifies molecules outside of the rarity asset but influences the molecular structure and scientific properties. 305*a* and 310 exemplifies scientific samples which detect external and internal like properties. 309 exemplifies a broad area of similar or dissimilar scientific measurements for both internal or external XYZ coordinates. 306*a* and 306*b* represents the geometric pathway and relationship between like, unlike or a range of scientific measurements as it relates to asset location.

FIG. 4 shows a GRV Digital Entry example where scientific measurements identification 402 not only identifies the scientific measurements, it precisely locates where the data was measured i.e., on the surface of an asset (XY coordinate) or in the body of the asset (XYZ) coordinate as shown by 402 Scientific Identification layers. In addition, GRV can compare an historical data measurements of an asset in order to assist sellers and to prove to perspective buyers that the asset hasn't been damaged and is the same asset as previously identified by the GRV system. The GRV system's secure data entries in another embodiment of the present invention utilize cross comparatives of one or more scientific measurements. 403 represents various scientific measurements tests and comparatives to other scientific data, data entry and identification results over a period of time. The example used in 401 compares datasets over 22 tests. It is obvious to anyone familiar with the art that the tests could be performed and entered contiguously in one short period of time (a few minutes) or separately over period of many years.

In one embodiment of the present invention as shown by 413, a 360 degree (XYZ) scientific measurement and its' corresponding data are securely entered into the computer system and encrypted by the computer as shown by 404. 404 exemplified an important embodiment of the present invention, whereas; The location of the scientific findings, the results of the scientific discoveries, the cross comparatives and asset analytics as exemplified by 401 helps lower the risk of fraud, asset swapping, asset deterioration from an earlier timestamp measurement and buyer-seller confidence to help restore trust in high-value (as previously described) assets sold through the internet. In addition, in yet another embodiment an asset's Computer Generated Geometrical Vettinization (CGGV) 404 can not only randomly mix the scientific variables and but decrypt scientific measurement data in a readable format for companies and organizations which have paid and authorized access to receive and read such data. The GRV system multidimensional and includes multivariate analysis (MVA) and Alternatives of Analysis (AoA) in order to identify not only identify the asset but re-identify the same asset when resold. The GRV and PAM system represents a dynamic comparative of scientific data measurements which any of which could be not only compared to other scientific inputs but compared to older datasets. Scientific data includes but is not limited to 412 Pyrolysis-gas chromatography-mass spectrometry (Py-GC-MS), Molecular Raman Spectroscopy (MRS) 406, Laser-desorption ionization-time of flight-mass spectroscopy (LDI-TOF-MS) High performance liquid chromatography (HPLC) 408, Gamma-Ray Spectroscopy (GRS) 405, Tracer Variant Polymer Emulsion (TVPE) 411, Sound, resonance and reverberation (SRR) testing 410, Ultraviolet light (UV) 409, electromagnetic radiation, Digital High definition videos, photos (HDVP) 407, Electron microscopy (SEM) coupled with energy dispersive Xray fluorescence (EDX) 411 and other scientific measurements. 413 and 414 represents an example of one or more scientific measurements taken at a later time when required, it is obvious to anyone familiar with the art that all scientific measurement can be dynamically and randomly entered by the GRV, Computer Generated Geometric Vettinization (CGGV) and manually programmed to illustrate one distinct variable such as for example only HPLC valuations or a defined color code, contour, IR property etc. Thus, the GRV Digital [0085] Data Entry System computes an assets geometric location as a variable to the finding, discovery and can prevent fraud by utilizing millions of combinations of variables through the present invention's multilayered, multidimensional, multivariate and cross comparable data points for any asset. It is obvious to anyone familiar with the art that the present invention for the first time in history utilizes a new powerful weapon against forgeries and fraud for any tangible and intangible asset. In addition, the present invention's software can be developed as a platform for all online merchandisers selling and buying tangible and intangible assets.

FIG. 5 represents a transactional buyer-seller GRV exchange warehouse and data entry system which incorporates all combinations of scientific measurement as it relates to its geographic locator technology. In one embodiment of the present invention includes a GRV warehouse can provide a trusted $3^{rd}$ party exchange tagging system, protection system, appraisal station, shipment receiving station for sellers and shipment dock for buyers. In one embodiment of the present invention rarity systems asset protection includes a sensor station for tagging and tracking and historical legacy tagging for future transactions, smart storage, creators fingerprint identification station, rarity software processing and all related robotic, electronic and mechanical variations for any size of rarity.

FIG. 6. Exemplifies a GRV Robotic Mobile scientific device (RMSD) 602*a* and controller system serving one or more rarity assets (tangible and intangible assets) 601. Rarity assets 601 as previously described include valuable tangible assets which could be defined any and all classification of rarity assets such as for example; coins, gems, fine art, rare vehicles, antiquities, antiques, time pieces, musical instruments, precision instruments, historical designs, architectural renderings and structures, and special collections, sports and entertainment memorabilia, athletic contracts, equine related sports i.e. racehorse fractional share ownership, robotic entertainments, rare books, rare documents, autographs, fine wines and spirits, recovered treasures and other man/woman-made rarities, environmental geological and archeological rarities, historical artifacts, documents and all other tangible and intangible assets (copyright, brands, trademarks, IP etc.). 603 exemplifies the rotation of the Robotic Mobile Scientific Device. The RMSD can be configured and physically supported to rotate around the rarity asset in order to scientifically test, measure and scan the object. In one embodiment of the present invention, RMSD (602*a*, 602*b*, 602*c*) could be used for example to securely grade and examine fine art, coins, stamps, antiques, time pieces and other rarity assets as previously described. In addition, the RMSD can digitize the information and transmit the scientific measurement to one or more GRV centers, customers and asset owners for example. In another embodiment the GRV could utilize various software analytic diagnostic tools assimilate the scientific measurements as exemplified by 604. It is obvious to anyone familiar with the art that the RMSD unit can be equipped with a plurality of scientific measurements and variations of scientific measurement components in order to conform to the rarity type, size, scope and topography. For example, the RMSD unit could be coupled with an automobile's diagnostics in order to both measure, film (a scientific component both described and exemplified in FIG. 4), grade and measure true authentication, value and other pertinent information for the owner or other third party. In addition, as previously described, the GRV system could evaluate deterioration as it compared to previous historical evaluations and measurements.

FIG. 7. In one embodiment of the present invention, creators of rarity assets (works of art) can embed they're biological footprint material 702 including; blood, semen, saliva, urine, feces, hair, teeth, bone, tissue and cells can be used to extract DNA according to the standard procedure known to the people familiar with the art. The creator's DNA in one embodiment of the present invention can utilize submicron particles (micro- or nano-particles). It is obvious to anyone familiar with the art that DNA and RNA particles could be numerically digitized as shown in 703 or actually embed, implant one or more creator's biodata within the work of art (Rarity). In addition, anyone familiar with the art knows that a mesoporous silica body defining a plurality of pores can be used to condense and preserve DNA over an indefinite period of time. The submicron particles may be spherical or non-spherical, and may include a cationic polymer or co-polymer on the surface of said silica body where DNA can be electrostatically bound to the said polymer or copolymer. Furthermore, the cationic polymer is selected from the group consisting of but not limited to, polyethylene inline, polyamidoamine, poly L-lysine, poly (allylamine), poly-L-arginine, chitosan, poly(2-N-(dimethylaminoethyl)methacrylate) (pDMAEMA) and poly(amidoamine) (PAMAM) and poly(diallyldimethylammonium chloride) etc. The cationic co-polymer is a co-polymer composed of the aforementioned polymers with other polymers which give additional properties to the particles. 704 represents geometric graphing of the DNA particles on the surface layer of the rarity asset and or within the surface. As previously described the GRV system could embed the particles whilst encrypting the location of the implanted particles thus allowing a bio-identification pathway and bio-trail of the said locations as represented by 704. It is obvious to people familiar with the art that one as represented by 703 or more location and DNA particles 704 could be embedded. In addition, one embodiment of the present invention provides the integration of specialized GRV secure DNA locator software as it relates to the aforementioned RMSD device and controller. It is understood that the GRV DNA software could be used for either mobile 706 or fixed scientific measurement hardware as well. 701 represents one or more rarity and classifications of rarities. 705 shows an example of a controller hardware device which is reading a rarity's DNA locations within a piece of fine art. In another embodiment of the present invention, DNA imbedded canvases, DNA imbedded paint as well as any embedded material could also carry the DNA code of one or more creators.

DNA particles generally breakdown with time and thus need to be protected when inserted, implanted on or within a layer of the rarity. One embodiment of the present invention utilizes a GRV protective coating named DNA/mesoporous silica polyplex can then be further coated with materials including, but not limited to silica, gold, silver or others for an additional protection. Further, the coating material can be grafted with sensors, antennas, photoactive material and radio frequency sensitive material etc.

The fingerprinting of the DNA entrapped within DNA/mesoporous silica polyplex can be performed non-invasively by DNA sensors/readers, NIR spectroscopy, confocal microscopy, ecological niche modeling, magnetic resonance spectroscopy, digital microdissection by tomography using high-resolution X-rays (VHR-CT, Raman spectroscopy with acoustic levitation, and wing interference patterns (WIPs) etc.

In addition, mesoporous silica nanoparticles (MSN) can be produced using the sol-gel method. Briefly, the MSNs are created by dissolving cetyltrimethylammonium bromide (CTAB, 95%) in water with sodium hydroxide solution while heating the solution to 80° C. Next, tetraethylorthosilicate is added to the solution. After 15 min, 3-(trihydroxysilyl) propyl methylphosphonate can be added into the mixture. The solution is then stirred for 2 h, during which MSNs began to form. Particles is collected following centrifugation and washed with methanol. Acidic methanol is then used to flush the pores in the MSNs to rid them of the CTAB surfactants. The addition of the cationic PEI coating (low molecular weight) to the MSNs can be conducted by suspending the MSNs in PEI ethanolic solution which is then sonicated and stirred (repeated twice). The MSNs can then be washed in ethanol to remove unbound PEI. The formation of DNA/MSN polyplex is based on mutual attraction between positive and negative charges. The DNA/MSN polyplex is prepared at various DNA:MSN weight ratios by gently dropwise adding the PEI modified MSN solution to equal volumes of DNA solution. The mixture is vortexed gently for pre-determined time period and left at room temperature for an additional time period to form DNA/MSN polyplex. The compact structure of the charge-neutralized core provides excellent protection of DNA samples.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

It will be further understood that various changes in the details, materials, and arrangements of the parts which have been described and illustrated in order to explain the nature of this invention may be made by those skilled in the art without departing from the scope of the invention as expressed in the claims to be filed upon the USPTO utility and International filing.

We claim:

1. A method for authentication of an asset, comprising:

embedding biological material of a creator of the asset at a first location, wherein the biological material includes DNA particles within a protective coating to mitigate breakdown and embedded in the asset;

retaining the first location in an encrypted form;

determining a set of particle properties from the asset, wherein each property of the set of particle properties includes a measurable or ascertainable property of the asset;

correlating the set of particle properties with a set of locations on the asset to generate a particle asset map for the asset, wherein the set of locations respectively correspond to a location on the asset where a respective particle property is determined;

retaining the particle asset map for the asset;

receiving input indicative of one or more properties determined based on the asset and indicative of a biomarker of the creator of the asset;

comparing the particle asset map for the asset to the input received and comparing the input indicative of the biomarker of the creator to the biological material embedded at the location encrypted; and authenticating the asset based on the comparison.

2. The method of claim 1, wherein the particle asset map is a multi-dimensional correlation map comprises three or more dimensions.

3. The method of claim 2 wherein fraudulent assets are assessed by their failure to align their authenticity as determined by comparing and contrasting their particle asset map with said multi-dimensional correlation map.

4. The method of claim 1 wherein asset particle properties are analyzed for environmental time-based effects.

5. The method of authentication of claim 1 adapted to provide secure online trading, the method further comprising the steps of:

setting up an online trading platform for assets or fractional shares of assets; and, generating correlative data assessments of authenticity for one or more assets displayed in connection with said online trading platform, whereby said online trading platform is secured.

6. The method of claim 5 wherein said correlation data is encrypted.

7. The method of authentication of claim 1, the method of authentication further comprising the steps of:

gathering auxiliary information related to the authenticity of the asset; and, using said auxiliary information to modify the particle asset map of the asset.

8. The method of claim 1, wherein at least one particle property of the set of particle properties comprises asset property details provided by Raman spectroscopy.

9. The method of claim 1, wherein at least one particle property of the set of particle properties comprises asset property details provided by pyrolysis-gas chromatograph-mass spectrometry.

10. The method of claim 1, wherein at least one particle property of the set of particle properties comprises asset property details provided by laser desorption ionization time of flight mass spectroscopy.

11. The method of claim 1, wherein at least one particle property of the set of particle properties comprises asset property details provided by high performance liquid chromatography.

12. The method of claim 1, wherein at least one particle property of the set of particle properties comprises asset property details provided by electron microscopy coupled with energy dispersive X-ray fluorescence-topography.

13. The method of claim 1, wherein at least one particle property of the set of particle properties comprises asset property details provided by gamma ray spectroscopy.

14. The method of claim 1, wherein at least one particle property of the set of particle properties comprises asset property details provided by sound, resonance and reverberation testing.

15. The method of claim 1, wherein at least one particle property of the set of particle properties comprises asset property details provided by smart water and polymer emulsion.

16. The method of claim 1, wherein at least one particle property of the set of particle properties comprises asset property details provided by ultra-violet electromagnetic radiation.

17. The method of claim 1 wherein said first particle property which represents a biomarker of a creator of said one or more assets comprises a nucleic acid component.

18. The method of claim 17 wherein said nucleic acid component comprises nucleic acid included within a nucleic acid-mesoporous silica polyplex.

19. The method of claim 1 wherein the asset authentication is assisted at least in part by implementation of an artificial intelligence program.

20. The method of claim 1, wherein the set of particle properties includes at least two particle properties selected from the group consisting of particle property details provided by Raman spectroscopy, property details provided by pyrolysis-gas chromatograph-mass spectrometry, property details provided by laser desorption ionization time of flight mass spectroscopy, property details provided by high performance liquid chromatography, property details provided by electron microscopy coupled with energy dispersive X-ray fluorescence-topography, property details provided by gamma ray spectroscopy, property details provided by sound, resonance and reverberation testing, property details provided by smart water and polymer emulsion, and, property details provided by ultra-violet electromagnetic radiation.

21. The method of claim 1 further comprising embedding the biomarker of said respective creator, which step comprises:

obtaining the biomarker;

preparing the biomarker for being embedded in the asset; and, embedding the biomarker into the asset.

22. The method in claim 21, wherein the asset is a painting and the biomarker comprises the asset creator's DNA.

23. A non-transitory, computer readable medium having stored thereon toolkit software to carry out the method of claim 1.

24. The medium of claim 23 further wherein said toolkit software enables authorized traders to decrypt encrypted trading information.

25. The medium of claim 23 further wherein said toolkit software is accessible through social media applications.

* * * * *